United States Patent [19]

Zeller

[11] Patent Number: 4,696,634
[45] Date of Patent: Sep. 29, 1987

[54] APPARATUS FOR PARTICULATING AN OLEAGINOUS PRODUCT

[75] Inventor: Zellis C. Zeller, Des Moines, Iowa

[73] Assignee: Triple "F", Inc., Des Moines, Iowa

[21] Appl. No.: 741,859

[22] Filed: Jun. 6, 1985

[51] Int. Cl.⁴ .................. B29C 43/46; B29C 47/00
[52] U.S. Cl. .................. 425/237; 425/376 B; 425/395; 425/DIG. 230
[58] Field of Search .............. 425/363, 241, 239, 328, 425/378 R, 324.1, 233, 237, 194, 195, 376 B, 395, DIG. 230; 99/383, 353; 426/512, 513; 366/144

[56] References Cited

U.S. PATENT DOCUMENTS

| | | | |
|---|---|---|---|
| 860,342 | 7/1907 | Taylor | 425/236 |
| 1,326,930 | 1/1920 | Hewitt | 425/239 |
| 1,347,361 | 7/1920 | Bibb | 425/363 |
| 2,310,748 | 2/1943 | Pearson | 425/237 |
| 2,909,131 | 10/1959 | Baur | 425/363 |
| 2,979,799 | 4/1961 | Decker | 425/237 |
| 3,219,786 | 11/1965 | Wenzel | 425/378 R |
| 3,522,627 | 8/1970 | Vanzo | 425/378 R |
| 3,602,155 | 8/1971 | Mendoza | 425/241 |
| 3,615,693 | 10/1971 | Billerbeck | 426/513 |
| 3,644,125 | 2/1972 | Lobiondo | 426/513 |
| 3,734,659 | 5/1973 | Harris | 425/237 |
| 3,765,319 | 10/1973 | Fox | 99/343 |
| 3,824,054 | 7/1974 | Harris | 425/363 |
| 3,870,583 | 3/1975 | Gidge | 425/362 |
| 3,922,132 | 11/1975 | Lauterbach | 425/237 |
| 3,969,062 | 7/1976 | Komarek | 425/363 |
| 4,017,241 | 4/1977 | Papinchak | 425/363 |
| 4,081,229 | 3/1978 | Moore | 425/237 |
| 4,127,373 | 11/1973 | Anders et al. | 425/327 |
| 4,229,487 | 10/1980 | Crothers | 425/237 |
| 4,368,165 | 1/1983 | Bergendahl | 425/237 |
| 4,483,046 | 11/1984 | Briddell | 426/513 |
| 4,601,728 | 7/1986 | Dungs et al. | 425/237 |

FOREIGN PATENT DOCUMENTS

| | | | |
|---|---|---|---|
| 0082035 | 10/1982 | Japan | 425/378 R |
| 1060491 | 12/1983 | U.S.S.R. | 425/378 R |

Primary Examiner—Willard E. Hoag
Attorney, Agent, or Firm—Rudolph L. Lowell

[57] ABSTRACT

Apparatus for processing of an oleaginous product in an extruder under pressure and heat and then introducing the product, while under such pressure and heat, into a forming unit for particulating the product into a predetermined substantially uniform size and shape. The operation is continuous with the forming unit comprising an attachment mounted at the extruder product outlet to receive directly therefrom the processed product.

3 Claims, 6 Drawing Figures

APPARATUS FOR PARTICULATING AN OLEAGINOUS PRODUCT

BACKGROUND OF THE INVENTION

The use of a pair of rollers for forming various products is well known as exemplified in U.S. Pat. Nos. 3,870,583; 4,127,373 and 4,229,487, and wherein the material acted upon is in a raw or uncooked condition. In U.S. Pat. No. 4,127,373, coacting rollers are used to produce films of synthetic plastics or rubber materials; and in U.S. Pat. No. 3,870,583, for forming a carpet of a natural mulch material.

In U.S. Pat. No. 4,229,487, a cookie machine utilizes a pair of rollers for receiving therebetween cookie dough. One of the rollers is formed with a plurality of inverted cone shaped cavities, each of which is teflon coated to prevent the dough from sticking in the cavities. The other roller has a corrugated peripheral surface and functions as a feed roller to carry dough from a hopper for transfer into the cookie cavities. Excess dough is scraped from the cavities by a doctor blade. The shaped cookie dough is removed from the mold cavities by a conveyor belt having a resilient transfer drum at one end for pressing the conveyor belt against the cookie molds for removal from the roller cavities.

In the present invention press rollers form part of a particulate product forming unit so as to receive therebetween a processed or cooked flowable oleaginous product which is retained at the heat and pressure conditions under which it was processed until after discharge from between the rollers. The oleaginous product is formed into a particle size in the contact zone of the rollers, and self-ejected from the rollers on admission into the atmosphere.

SUMMARY OF THE INVENTION

The invention provides an economical and efficient method for flaking or forming to a substantially particle size an extruded, cooked or processed oleaginous product for the commercial feeding of shrimp, lobster, fish and the like. Where the extruded product is in a generally lumpy condition, namely non-uniform in size, the larger product lumps tend to sink and collect at the bottom of a pool, pond or tank. Feed is thus wasted and the amount of feed actually consumed cannot be determined. These objections are substantially eliminated when the product is of a size to be buoyant and visually observed. The particulate product of this invention is made of a uniform size by introducing the product, while under the heat and pressure conditions of the extruder process, into a contact zone formed between a pair of contacting rollers; one of which has its peripheral surface formed with a plurality of particulate mold cavities. As the product travels through the contact zone it is pressed into the mold cavities and travels from the contact zone into the atmosphere where it expands for self-ejection from the cavities. The product is thus particulated continuously with its discharge from the extruder.

DESCRIPTION OF THE PREFERRED EMBODIMENT

Figure 1:
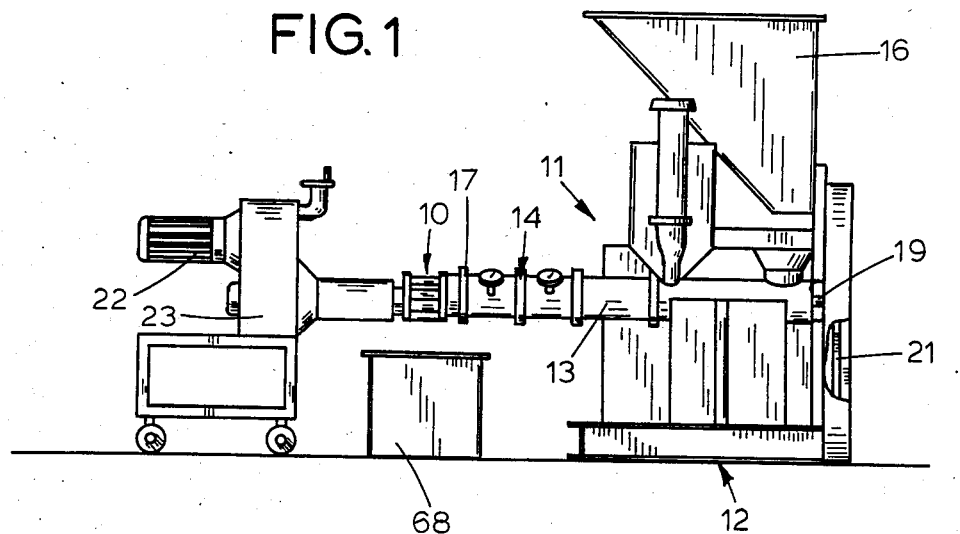
FIG. 1 is a diagrammatic illustration of an extruding machine for processing an eleaginous product showing the particulate forming unit of this invention in assembly relation therewith.

With reference to the drawings, the product forming unit of this invention, indicated generally as 10 in FIG. 1, is shown in assembly relation with an extruding machine 11 for processing an oleaginous product such as soybeans, corn, and the like. The extruding machine includes a frame structure 12 for supporting a tail section 13 of an extruder housing or barrel 14. The material to be processed in the extruder machine 11 is supplied from hoppers 16 which are mounted on the frame structure 12 and arranged to deliver the material into the extruder tail section 13. The processed product is discharged from the head section 17 of the housing 14 directly into the forming unit 10.

In the extruding process, the product is compressed under progressively increasing pressures by an extruder screw 18 (FIG. 3) to about 150 p.s.i. concurrently with being progressively heated to a cooking temperature by frictional heat only to a cooking temperature to at least 240° F. The screw 18 is power operated by an electric motor (not shown) operatively connected to a screw drive shaft 19 (FIG. 1) by an enclosed belt drive 21. The forming unit 10 is driven by a power unit 22 through a variable speed drive mechanism 23.

When the cooked or processed product is discharged into the atmosphere, its temperature substantially instantly drops to about 212° F. concurrently with being expanded. The product discharged from the extruding machine has frothing or bubbling characteristics and upon being cooled in the atmosphere expands to form lumps or loose agglomerates. For a more detailed description of the extruding machine 11 and the processed product, reference is made to U.S. Pat. No. 3,765,319.

The agglomerate or lump condition of the resultant extruded product is generally satisfactory for the feeding of livestock and poultry but has the disadvantage in the feeding of shrimp, fish and the like due in its tendency, during a feeding operation, to sink and loose itself at the bottom of a pond or tank. Since the food lying on the tank bottom is not readily observable and its amount determinable, excess feed is generally fed with resultant increased feed costs. Where the feed product is fed to fish or shrimp in a particulated form, it remains buoyant for a time period of sufficient duration to permit visual observation of its consumption. The product fed is thus conserved along with the maintaining of more accurate records of the feed required for the feeding operations.

Figure 2:
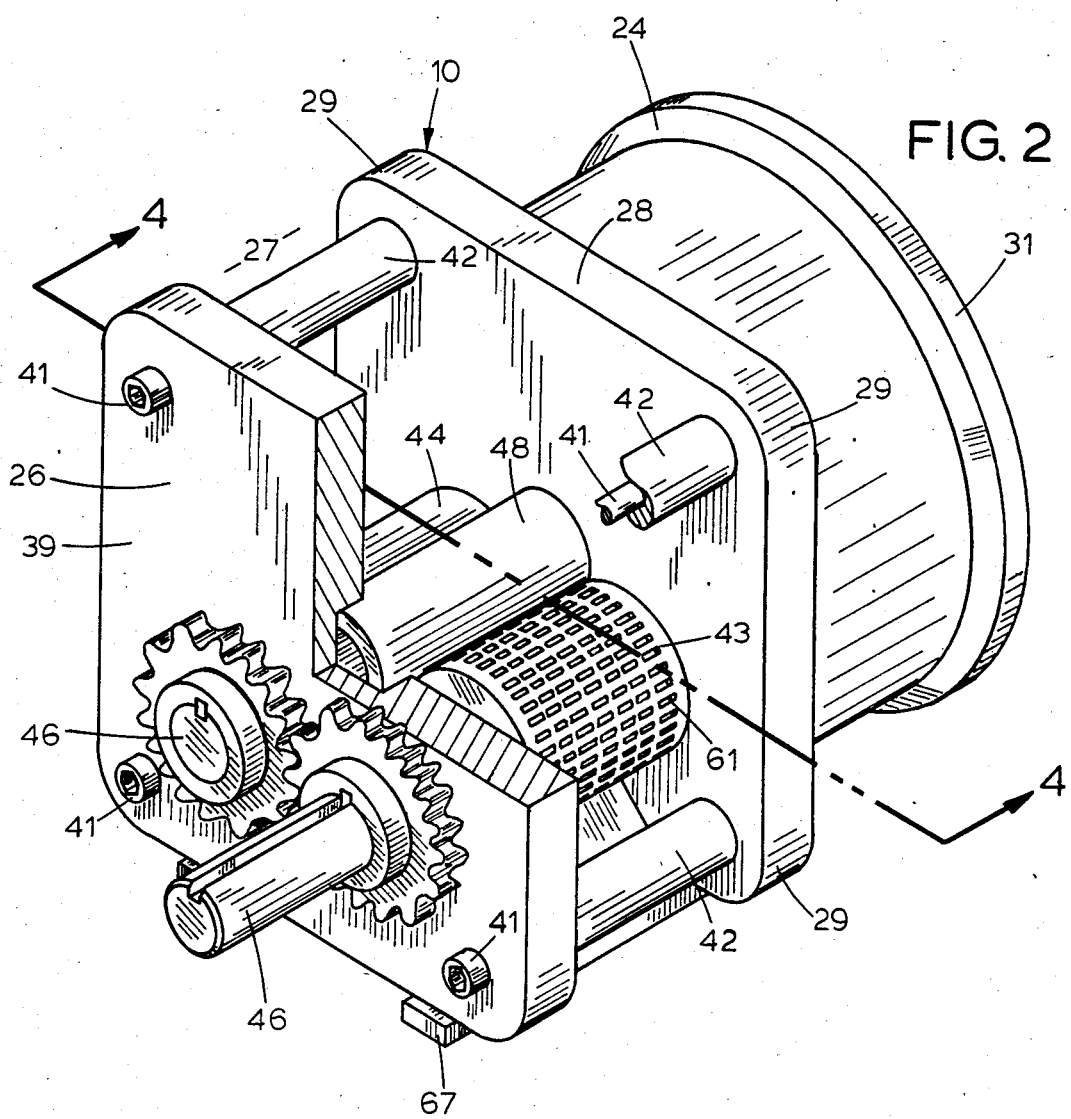
FIG. 2 is an enlarged perspective view of the particulate forming unit with some parts broken away and other parts in section to more clearly show its construction.
Figure 3:
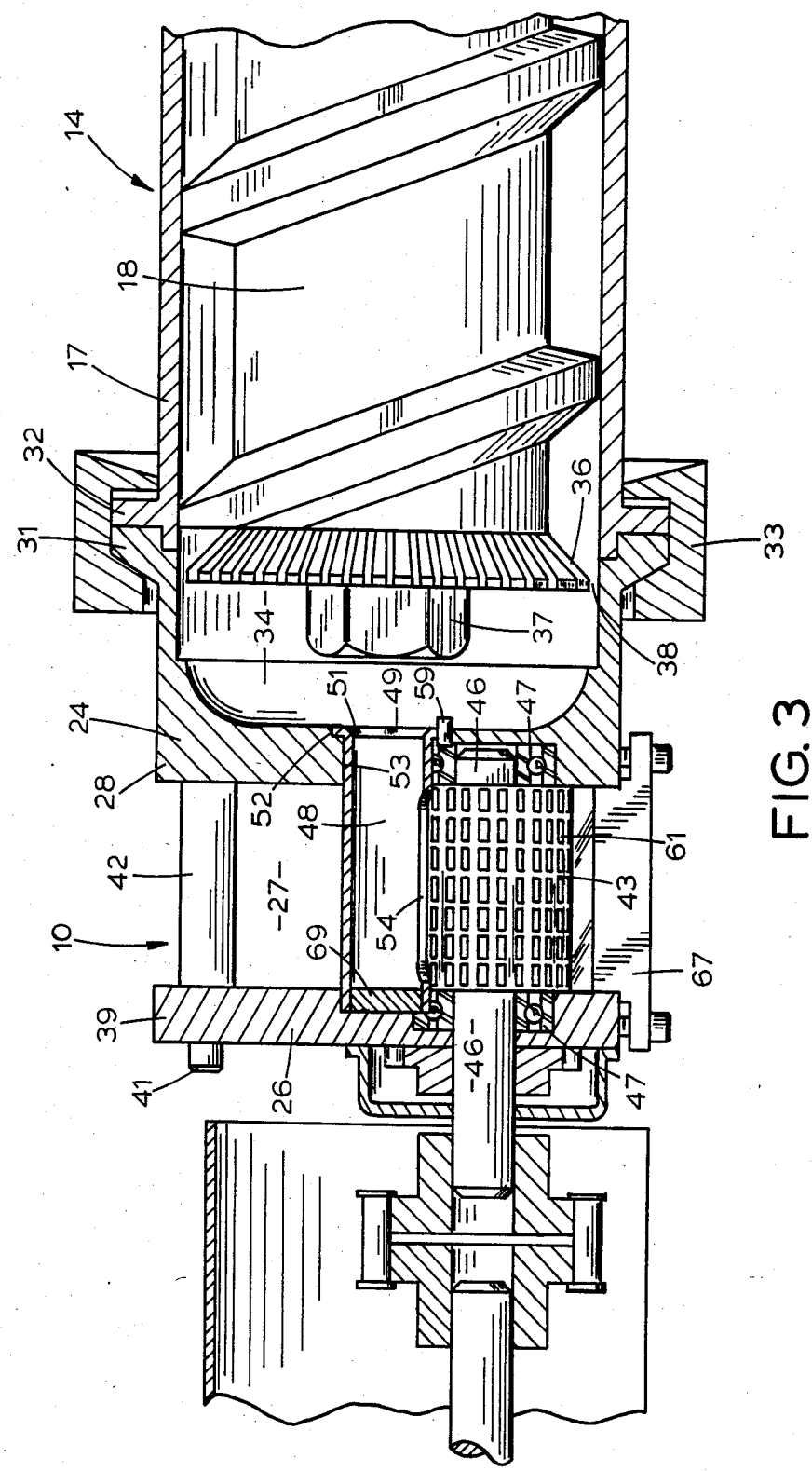
FIG. 3 is an enlarged sectional detail showing the mounting of the forming unit on the product discharge end of the extruder.

A particulation of the product extruded from the machine 11 is provided by the product forming unit 10 (FIGS. 2 and 3). The forming unit includes an open housing structure comprised of a mounting section 24 and a drive section 26 which are longitudinally spaced apart to define an open roller section 27. The mounting section 24 is of a generally cylindrical shape closed at its outer end by an integral cover plate 28 of a generally rectangular shape and of a size such that the outer peripheral surface of the mounting section 24 is inscribed relative thereto to provide for the corners 29 of the cover plate being projected radially from such peripheral surface. The opposite or inner end of the mounting section 24 is formed with a radially projected annular mounting flange 31 for fitting in a mating relation with an associated flange 32 (FIG. 3) formed on the head section 17 of the extruder housing 14. The flanges 31 and 32 are secured together by a split clamp ring 33.

The mounting section 24 is formed inwardly from the flange or inner end thereof with a concavity 34 (FIG. 3) of a generally dome shape and terminating at the cover plate 28. Located within the cavity 34 is a terminal steam-lock ring 36 secured by a holding nut 37 to the extruding screw 18 to form with the inner peripheral surface of the screw a restricted annular discharge outlet 38 through which the processed product is admitted into the concavity 34.

The drive section of the forming unit 10 includes a plate member 39 of a size and shape corresponding to the cover plate 22 of the mounting section 24. The plate member 39 is secured to the cover plate 28 by elongated bolts 41 threadable into the cover plate and provided with tubular spacer members 42 located between the cover plate 28 and plate member 39 and of a length to define the longitudinal dimension of the roller section 27. A pair of rollers 43 and 44 (FIGS. 2 and 4) in the roller section 27 are arranged transversely opposite each other and extend longitudinally between the plate member 39 and the cover plate 28. The rollers are of an axial length coextensive with the axial length of the spacer members 42 and have their shafts 46 (FIG. 3) rotatably supported in bearings 47 mounted in the cover plate 28 and the plate member 39 so that the opposite ends of each roller are in contact with an adjacent cover plate and plate member.

Positioned above and between the rollers 43 and 44 (FIGS. 2 and 4) and extended axially of the rollers is a receiving chamber or hopper 48 of a cylindrical tubular shape which extends between and is supported in the cover plate 28 and plate member 39 such that the axis of the receiving chamber is in substantial coaxial alignment with the axis of the extruder screw 18 (FIG. 3). The inner or product inlet end 49 of the chamber 48 projects through the cover plate 28 and is open to the concavity 34. An annular flange 51 at the inlet end 49 of the chamber 48 is seated within an annular groove 52 formed about the bore 53 in the cover plate 28 through which the chamber 48 extends. This seating engagement defines the assembly relation of an elongated outlet 54 in the lower portion of the chamber 48, relative to the rollers 43 and 44, for a purpose to appear later.

Figure 4:
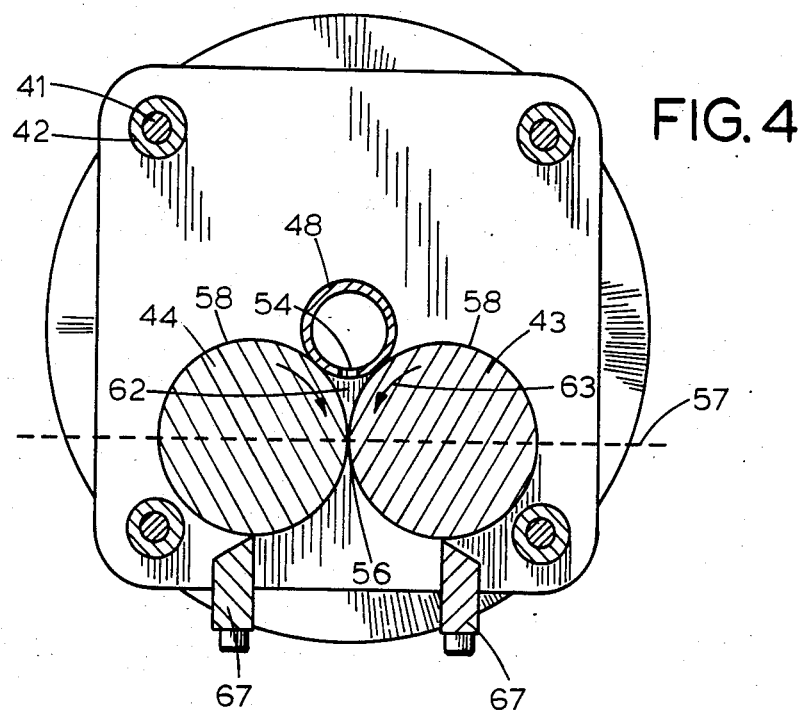
FIG. 4 is a sectional view taken along the line 4—4 in FIG. 2.

Referring to FIG. 4, it is seen that the rollers 43 and 44 have linear contact engagement to provide an axially extended contact zone 56 which lies in a plane, indicated at 57, common to the axes of the rollers 43 and 44. Opposed upper peripheral portions 58 of the rollers are in contact with the outer peripheral surface of the chamber 48 to opposite sides of the outlet 54 to form a product directing trough 62 from the chamber 48 to the contact zone 56. This relative arrangement of the outlet 54 with the contact zone 56 and peripheral portions 58 is maintained by a locking pin 59 (FIG. 3) carried in the cover plate 28 in locked engagement with the annular flange 51 at the chamber inlet 49. It is seen therefore, and as best appears in FIG. 4, that the processed or cooked product discharged from the annular outlet 38 and into the concavity 34 is forced into the chamber 48 at the inlet 49 and outwardly therefrom at the outlet 54 for travel between the peripheral portions 58 of the rollers 43 and 44 into the roller contact zone 56. It will also be apparent that this travel of the processed product takes place out of the atmosphere and under substantially the heat and pressure conditions of the product extruded through the annular discharge opening 38. These conditions are substantially maintained until after the product has passed through the contact zone 56 and into the atmosphere, where the pressure on the product drops to atmospheric pressure concurrently with the product being cooled to about 212° F.

Figures 5, 6:
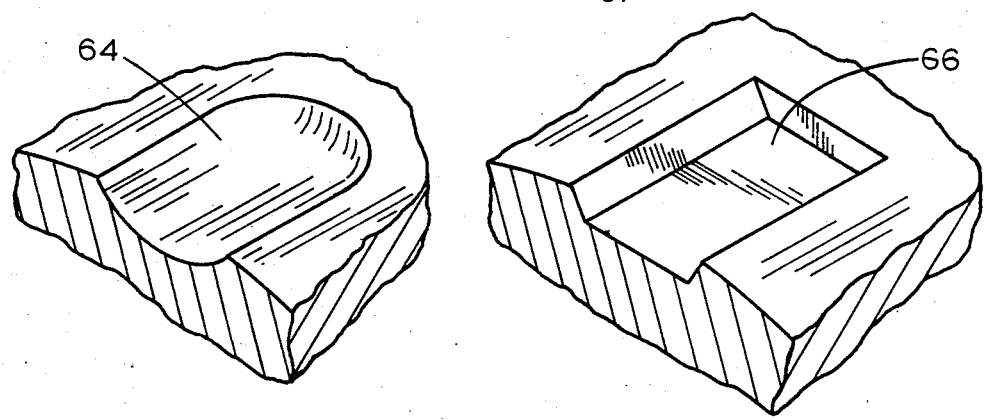
FIG. 5 is an enlarged perspective view showing a mold cavity for forming the product.
FIG. 6 is an enlarged perspective view showing another mold cavity for forming the product.

To particulate the product being admitted into the atmosphere the roller 43 has the peripheral surface thereof formed with a plurality of cavities or molds 61 while the peripheral surface of the roller 44 is smooth and continuous. The product from the outlet 54 of the hopper or chamber 48 is moved through the trough 62 by the rotation of the peripheral surfaces 58 in the direction of the arrows, indicated at 63, into the linear contact zone 56. In passing through the contact zone 56 the product is pressed by the smooth roller 44 into the cavities 61. On travel of the filled cavities from the contact zone into the atmosphere the product immediately expands so as to be self-ejected from the cavities 61. A cavity 61 may be of a generally elongated elliptical shape as shown for the cavity 64 in FIG. 5 or of an elongated rectangular shape as illustrated for the cavity 66 in FIG. 6. In the event any of the product should adhere to the roller surfaces after passage through the contact zone 56, such adhering product is removed by scraper or doctor blades 67 (FIG. 4) for travel with the particulated product into a bin 68 (FIG. 1).

It is seen, therefore, that the chamber 48 functions as a hopper for feeding product through the outlet 54 into the trough 62 formed by the lower portion of the hopper 48 and the peripheral surfaces 58 of the rollers 43 and 44. In this respect, it is to be noted that the chamber 48 is closed by a plug 69 at the end thereof carried in the plate member 39, and that the ends of the trough 62 are closed by the contiguous relation of the roller end surfaces with the cover plate 28 and plate member 39. The rate of travel of the product from the extruding machine 11 into the contact zone 56 is adjusted so as not to exceed the product flow through the contact zone 56. This is accomplished by adjustment of the variable speed mechanism 23 (FIG. 1) to vary the rotational speeds of the rollers 43 and 44 with respect to the volume flow of product from the extruding machine 11.

Although the invention has been described with respect to a preferred embodiment thereof, it is to be understood that it is not to be so limited since changes and modifications can be made therein which are within the full intended scope of this invention as defined by the appended claims.

I claim:

1. In an extruder machine for processing an oleaginous product under conditions of pressure and heat having a discharge outlet and wherein the product on admission into the atmosphere is cooled and expanded and a product forming unit having rolls for receiving the product from said outlet while under said pressure and heat conditions the improvement comprising:

(a) a housing having an elongated product receiving chamber means with an inlet and an elongated outlet, (b) means mounting said housing on said extruder machine with said inlet open to said discharge outlet, said inlet being at an end of said chamber means adjacent one of the ends of said rolls so that there is movement of the product through said chamber in a direction axially of said rolls, (c) a pair of like said rolls in said housing having peripheral contact in a linear zone located in a plane common to the axes of said rolls, (d) means rotatably supporting said rolls so that opposed peripheral portions thereof movable toward each other in a direction toward the linear contact zone are in contact engagement with said chamber means at opposite sides of said elongated outlet to provide a trough from said elongated outlet to said contact zone, and (e) means on said housing for confining the product in said trough within the axial length of said rolls, whereby the product under substantially the pressure and heat conditions at said discharge outlet is directed through said chamber means and trough into the rolls contact zone, (f) with one of said rolls having mold cavities in the peripheral surface thereof into which the product is pressed at said contact zone, said product on travel into the atmosphere from said contact zone being expanded and self-ejected from said cavities in the form of said mold cavities.

2. The invention according to claim 1 wherein:

(a) said elongated outlet is of a length substantially coextensive with the axial length of said rollers.

3. The invention according to claim 1, including:

(a) a motor means on said housing for rotating said rollers, (b) with the product travel through said roller contact zone and into the atmosphere being at a volume rate at least equal to the volume flow of the product from said discharge outlet.

* * * * *